United States Patent
Talur et al.

(10) Patent No.: US 7,889,712 B2
(45) Date of Patent: Feb. 15, 2011

(54) METHODS AND APPARATUS FOR PROVIDING LOOP FREE ROUTING TABLES

(75) Inventors: Dheerendra Talur, Fremont, CA (US); Rex Fernando, San Jose, CA (US); Avneesh Sachdev, San Jose, CA (US); Derek Man-Kit Yeung, Union City, CA (US)

(73) Assignee: Cisco Technology, Inc., San Jose, CA (US)

( * ) Notice: Subject to any disclaimer, the term of this patent is extended or adjusted under 35 U.S.C. 154(b) by 548 days.

(21) Appl. No.: 11/318,217

(22) Filed: Dec. 23, 2005

(65) Prior Publication Data

US 2006/0159034 A1  Jul. 20, 2006

Related U.S. Application Data

(60) Provisional application No. 60/638,954, filed on Dec. 23, 2004.

(51) Int. Cl.
 *H04L 12/28* (2006.01)
(52) U.S. Cl. .................................... 370/351
(58) Field of Classification Search ................ 370/238, 370/254, 255, 256, 351, 356, 389, 395.52
 See application file for complete search history.

(56) References Cited

U.S. PATENT DOCUMENTS

| | | | |
|---|---|---|---|
| 5,014,262 A * | 5/1991 | Harshavardhana | .......... 370/237 |
| 5,471,592 A | 11/1995 | Gove et al. | |
| 5,524,258 A | 6/1996 | Corby, Jr. et al. | |
| 5,677,851 A | 10/1997 | Kingdon et al. | |
| 5,734,649 A | 3/1998 | Carvey et al. | |
| 5,781,772 A | 7/1998 | Wilkinson, III et al. | |
| 5,802,278 A | 9/1998 | Isfeld et al. | |
| 5,838,894 A | 11/1998 | Horst | |
| 5,878,415 A | 3/1999 | Olds | |
| 5,905,725 A | 5/1999 | Sindhu et al. | |
| 5,909,440 A | 6/1999 | Ferguson et al. | |
| 5,920,699 A | 7/1999 | Bare | |
| 5,923,643 A | 7/1999 | Higgins et al. | |
| 5,930,256 A | 7/1999 | Greene et al. | |
| 6,011,795 A | 1/2000 | Varghese et al. | |
| 6,018,524 A | 1/2000 | Turner et al. | |
| 6,078,963 A | 6/2000 | Civaniar et al. | |
| 6,091,725 A | 7/2000 | Cheriton et al. | |
| 6,101,192 A | 8/2000 | Wakeland | |

(Continued)

OTHER PUBLICATIONS

"What's Inside a Router?", http://www-net.cs.umass.edu/kurose/network/inside/inside.htm, (observed Aug. 29, 2005),11 pgs.

(Continued)

*Primary Examiner*—Chirag G Shah
*Assistant Examiner*—Yong Zhou
(74) *Attorney, Agent, or Firm*—Schwegman, Lundberg & Woessner, P.A.

(57) ABSTRACT

A router is described that includes a routing table containing route information and a module to evaluate a route and detect a loop path associated with the route using the routing table. A process is described to detect and eliminate routing loops associated with recursive routes in a routing table, so as to provide a routing table that will be loop free.

20 Claims, 4 Drawing Sheets

U.S. PATENT DOCUMENTS

| | | | |
|---|---|---|---|
| 6,161,139 | A | 12/2000 | Win et al. |
| 6,192,405 | B1 | 2/2001 | Bunnell |
| 6,308,219 | B1 | 10/2001 | Hughes |
| 6,430,181 | B1 | 8/2002 | Tuckey |
| 6,453,413 | B1 | 9/2002 | Chen et al. |
| 6,526,055 | B1 | 2/2003 | Chiu et al. |
| 6,631,419 | B1 | 10/2003 | Greene |
| 6,636,895 | B1* | 10/2003 | Li et al. .................... 709/238 |
| 6,658,002 | B1 | 12/2003 | Ross et al. |
| 6,675,187 | B1 | 1/2004 | Greenberger |
| 6,687,781 | B2 | 2/2004 | Wynne et al. |
| 6,697,875 | B1 | 2/2004 | Wilson |
| 6,721,316 | B1 | 4/2004 | Epps et al. |
| 6,731,633 | B1 | 5/2004 | Sohor et al. |
| 6,732,203 | B2 | 5/2004 | Kanapathippillai et al. |
| 6,751,191 | B1 | 6/2004 | Davar et al. |
| 6,778,490 | B1 | 8/2004 | Achilles et al. |
| 6,785,728 | B1 | 8/2004 | Schneider et al. |
| 6,795,886 | B1 | 9/2004 | Nguyen |
| 6,801,950 | B1 | 10/2004 | O'Keeffe et al. |
| 6,804,815 | B1 | 10/2004 | Kerr et al. |
| 6,879,559 | B1 | 4/2005 | Blackmon et al. |
| 6,920,456 | B2 | 7/2005 | Lee et al. |
| 6,922,724 | B1 | 7/2005 | Freeman et al. |
| 6,941,487 | B1 | 9/2005 | Balakrishnan et al. |
| 6,944,183 | B1 | 9/2005 | Iyer et al. |
| 6,944,860 | B2 | 9/2005 | Schmidt |
| 6,954,220 | B1 | 10/2005 | Bowman-Amuah |
| 6,954,436 | B1 | 10/2005 | Yip et al. |
| 6,961,783 | B1 | 11/2005 | Cook et al. |
| 6,965,615 | B1 | 11/2005 | Kerr et al. |
| 6,973,488 | B1 | 12/2005 | Yavatkar et al. |
| 6,990,527 | B2 | 1/2006 | Spicer et al. |
| 7,006,431 | B1 | 2/2006 | Kanekar et al. |
| 7,020,718 | B2 | 3/2006 | Brawn et al. |
| 7,024,693 | B2 | 4/2006 | Byrne |
| 7,028,098 | B2 | 4/2006 | Mate et al. |
| 7,043,494 | B1 | 5/2006 | Joshi et al. |
| 7,051,039 | B1 | 5/2006 | Murthy et al. |
| 7,051,078 | B1 | 5/2006 | Cheriton |
| 7,054,315 | B2 | 5/2006 | Liao |
| 7,054,944 | B2 | 5/2006 | Tang et al. |
| 7,069,372 | B1 | 6/2006 | Leung, Jr. et al. |
| 7,069,536 | B2 | 6/2006 | Yaung |
| 7,073,196 | B1 | 7/2006 | Dowd et al. |
| 7,095,713 | B2 | 8/2006 | Willhite et al. |
| 7,096,499 | B2 | 8/2006 | Munson |
| 7,099,341 | B2 | 8/2006 | Lingafelt et al. |
| 7,103,708 | B2 | 9/2006 | Eatherton et al. |
| 7,111,071 | B1 | 9/2006 | Hooper |
| 7,124,203 | B2 | 10/2006 | Joshi et al. |
| 7,136,383 | B1 | 11/2006 | Wilson |
| 7,139,238 | B2 | 11/2006 | Hwang |
| 7,150,015 | B2 | 12/2006 | Pace et al. |
| 7,155,518 | B2 | 12/2006 | Forslow |
| 7,159,125 | B2 | 1/2007 | Beadles et al. |
| 7,167,918 | B1 | 1/2007 | Byrne et al. |
| 7,185,192 | B1 | 2/2007 | Kahn |
| 7,185,365 | B2 | 2/2007 | Tang et al. |
| 7,200,144 | B2 | 4/2007 | Terrell et al. |
| 7,200,865 | B2 | 4/2007 | Roscoe et al. |
| 7,203,171 | B1 | 4/2007 | Wright |
| 7,225,204 | B2 | 5/2007 | Manley et al. |
| 7,225,256 | B2 | 5/2007 | Villavicencio |
| 7,225,263 | B1 | 5/2007 | Clymer et al. |
| 7,227,842 | B1 | 6/2007 | Ji et al. |
| 7,230,912 | B1 | 6/2007 | Ghosh et al. |
| 7,231,661 | B1 | 6/2007 | Villavicencio et al. |
| 7,239,639 | B2 | 7/2007 | Cox et al. |
| 7,249,374 | B1 | 7/2007 | Lear et al. |
| 7,257,815 | B2 | 8/2007 | Gbadegesin et al. |
| 7,274,702 | B2 | 9/2007 | Toutant et al. |
| 7,274,703 | B2 | 9/2007 | Weyman et al. |
| 7,280,975 | B1 | 10/2007 | Donner |
| 7,302,701 | B2 | 11/2007 | Henry |
| 7,355,970 | B2 | 4/2008 | Lor |
| 7,382,787 | B1 | 6/2008 | Barnes et al. |
| 7,403,474 | B2 | 7/2008 | Rorie |
| 7,406,038 | B1 | 7/2008 | Oelke et al. |
| 7,418,536 | B2 | 8/2008 | Leung et al. |
| 7,450,438 | B1 | 11/2008 | Holst et al. |
| 7,525,904 | B1 | 4/2009 | Li et al. |
| 7,536,476 | B1 | 5/2009 | Alleyne |
| 7,710,991 | B1 | 5/2010 | Li et al. |
| 2002/0035639 | A1 | 3/2002 | Xu |
| 2003/0005178 | A1 | 1/2003 | Hemsath |
| 2003/0056001 | A1 | 3/2003 | Mate et al. |
| 2003/0056134 | A1 | 3/2003 | Kanapathippillai et al. |
| 2003/0091043 | A1 | 5/2003 | Mehrotra et al. |
| 2003/0108056 | A1 | 6/2003 | Sindhu et al. |
| 2003/0163589 | A1 | 8/2003 | Bunce et al. |
| 2003/0188192 | A1 | 10/2003 | Tang et al. |
| 2003/0208597 | A1 | 11/2003 | Belgaied |
| 2003/0212806 | A1 | 11/2003 | Mowers et al. |
| 2003/0212900 | A1 | 11/2003 | Liu et al. |
| 2004/0024888 | A1 | 2/2004 | Davis et al. |
| 2004/0139179 | A1* | 7/2004 | Beyda .................... 709/221 |
| 2006/0117126 | A1 | 6/2006 | Leung et al. |
| 2009/0063702 | A1 | 3/2009 | Holst et al. |

OTHER PUBLICATIONS

"Xelerated Packet Devices", *MicroDesign Resources Presentation, Network Processor Forum*, (Jun. 14, 2001), 11 pgs.

Belenkiy, A., "Deterministic IP Table Lookup at Wire Speed", *The Internet Global Summit (INET '99)*, http://www.isoc.org/inet99/proceedings/4j/4j_2.htm,(observed May 12, 2003), 18 pgs.

Cataldo, A., "Net Processor Startup Takes Pipelined Path to 40 Gbits/s", EETimes.com, (Jul. 2, 2001),2 pgs.

Chiueh, T.-C. , et al., "High-Performance IP Routing Table Lookup Using CPU Caching", *Proceedings, Eighteenth Annual Joint Conference of the IEEE Computer and Communication Societies (INFOCOM '99)*, vol. 3, (1999), 1421-1428.

Degermark, M. , et al., "Small Forwarding Tables for Fast Routing Lookups", *Proceedings, ACM SIGCOMM '97*, (1997), 3-14.

Gupta, P., et al., "Classifying Packets With Hierarchical Intelligent Cuttings", *IEEE Micro*, 21(1), (Jan./Feb. 2000), 34-41.

Gupta, P., et al., "Packet Classification on Multiple Fields", *Proceedings of the Conference on Applications, Technologies, Architectures, and Protocols for Computer Communication (ACM SIGCOMM '99)*, (1999),147-160.

Gupta, P., et al., "Routing Lookups in Hardware at Memory Access Speeds", *Proceedings, Seventeen Annual Joint Conference of the IEEE Computer and Communications Societies (INFOCOM '98)*, vol. 3, (1998), 1240-1247.

Kung, H. T., et al., "Algorithms for VLSI Processor Arrays", In: *Introduction to VLSI Systems*, Mead, C., et al., Editors, Addison-Wesley, Reading, MA,(1980), 271-292.

Lakshman, T. V., et al., "High-Speed Policy-Based Packet Forwarding Using Efficient Multi-Dimensional Range Matching", *Proceedings of the Conference on Applications, Technologies, Architectures, and Protocols for Computer Communications (ACM SIGCOMM '98)*, (1998), 203-214.

Lampson, B., et al., "IP Lookups Using Multiway and Multicolumn Search", *IEEE/ACM Transactions on Networking*, 7(3), (Jun. 1999), 324-334.

Lindberg, K., "Multi-Gigabit Routers", *Proceedings, HUT Internetworking Seminar*, http://www.tml.hut.fi/Opinnot/Tik-110.551/1998/papers/02/MultiGigabitRouter/paper.html,(observed May 12, 1998), 14 pgs.

McAuley, A. J., et al., "Fast Routing Table Lookup Using CAMs", *Proceedings, Twelfth Annual Joint Conference of the IEEE Computer and Communications Societies, Networking: Foundation for the Future (INFOCOM '93)*, vol. 3, (1993), 1382-1391.

Partridge, C., et al., "A 50-Gb/s IP Router", *IEEE/ACM Transactions on Networking*, 6(3), (Jun. 1998),237-248.

Qui, L., et al., "Fast Firewall Implementations for Software and Hardware-Based Routers", *Microsoft Technical Report MSR-TR-2001-61*, (Jun. 2001),18 pgs.

Srinivasan, V., et al., "Fast and Scalable Layer Four Switching", *Proceedings of the Conference on Applications, Technologies, Architectures, and Protocols for Computer Communications (ACM SIGCOMM '98)*, (1998), 191-202.

Srinivasan, V. et al., "Packet Classification Using Tuple Space Search", *Proceedings of the Conference on Applications, Technologies, Architectures, and Protocols (ACM SIGCOMM '99)*, (1999), 135-146.

Waldvogel, M., et al., "Scalable High Speed IP Routing Lookups", *Proceeding, ACM SIGCOMM '97*, (1997), 25-36.

Ballardie, A., "Core Based Trees (CBT) Multicast Routing Architecture", *RFC 2201*, (Sep. 1997), 1-15.

Czerwinski, Steven. E, et al., "An Architecture for a Secure Discovery Service", *5 th Annual ACM/IEEE International Conference On Mobile Computing and Networking*, (1999), pp. 24-35.

Finseth, C., "An Access Control Protocol, Sometimes Called TACACS", *RFC 1492*, (Jul. 1993), 1-21.

Ganti, V., et al., "Mining Very Large Databases", *Computer*, vol. 32,Issue 8, (Aug. 8, 1999), pp. 38-45.

Gladney, H. M, "Access Control for Large Collections", *ACM Transactions on Information Systems(TOIS)*,vol. 15,Issue 2, (Apr. 1997), pp. 154-194.

Gong, L., et al., "A Secure Identity-Based Capability System", *IEEE Symposium On Security and Privacy*, (May 1-3, 1989), pp. 56-63.

Gupta, Pankaj, et al., "Packet Classification Using Hierarchical Intelligent Cuttings", *IEEE Micro*, (2000), pp. 1-9.

Kille, S., "Representing the O/R Address Heirarchy in the X.500 Directory Information Tree", *RFC 2294*, (Mar. 1998), 1-13.

Kim, Tae-Hoon, et al., "Role-Based Decomposition For Improving Concurrency in Distributed Object-Oriented Software Development Environments", *23rd Annual International Computer Software and Applications Conference (COMPSAC)*, (Oct. 29, 1999), pp. 410-415.

Myers, J., "IMAP4 ACL Extension", *RFC 2086*, (Jan. 1997), 1-8.

Saltzer, Jerome H., "Protection and the Control of Information Sharing in Multics", *Communications of the ACM*, vol. 17,Issue 7, (Jul. 1974), pp. 388-402.

Stokes, E., et al., "Access Control Requirements for LDAP", *RFC 2820*, (May 2000), 1-9.

Wijnen, B., et al., "View-Based Access Control Model (VACM) for the Simple Network Management Protocol (SNMP)", *RFC 2575*, (Apr. 1999), 1-38.

\* cited by examiner

METHODS AND APPARATUS FOR PROVIDING LOOP FREE ROUTING TABLES

CLAIM OF PRIORITY

This patent application claims the benefit of priority, under 35 U.S.C. Section 119(e), to U.S. Provisional Patent Application Ser. No. 60/638,954, filed on Dec. 23, 2004, the entire content of which is incorporated herein by reference, in its entirety.

TECHNICAL FIELD

Various embodiments relate generally to the fields of networking, and in particular, but not by way of limitation, to a system and method including network routing.

BACKGROUND

Networking equipment such as routers includes routing tables which contain route information which is used by the routers to determine which output or egress port of the router a particular packet or message should be transmitted. A routing table contains a large number of entries for use by the router to determine how to forward packets that are received by the router. Conventional routing tables may contain hundreds of thousands of elements, and as a greater number of devices such as personal data assistants (PDAs), cell phones, and other devices are assigned IP addresses, the number of entries in a routing table is expected to grow substantially over the coming years. A route may have many paths associated therewith.

In a particular router, various processes (also known as "clients") of the router have the ability to add or delete routes within a routing table of the router. If these clients of the routing table add or delete routes that depend on each other, then the routing table can contain loops with routes that depend on each other.

As recognized by the present inventors these loops can lead to incorrect forwarding behavior by the router; adversely affect notifications from the routing table to its clients; or cause route oscillations to occur between the routing table and its clients. In other words, when clients of a routing table resolve and add or delete routes with remote next hops to the routing table, it is possible that two or more routes depending on each other are installed, and these loops in the routing table may cause incorrect forwarding operations.

Accordingly, as recognized by the present inventors, what is needed is a process to detect and eliminate routing loops associated with recursive routes in a routing table, so as to provide a routing table that will be loop free. It is against this background that various embodiments of the present invention were developed.

BRIEF DESCRIPTION OF THE DRAWINGS

The present invention is illustrated by way of example and not limitation in the figures of the accompanying drawings, in which like references indicate similar elements and in which.

DETAILED DESCRIPTION

Figure 1:
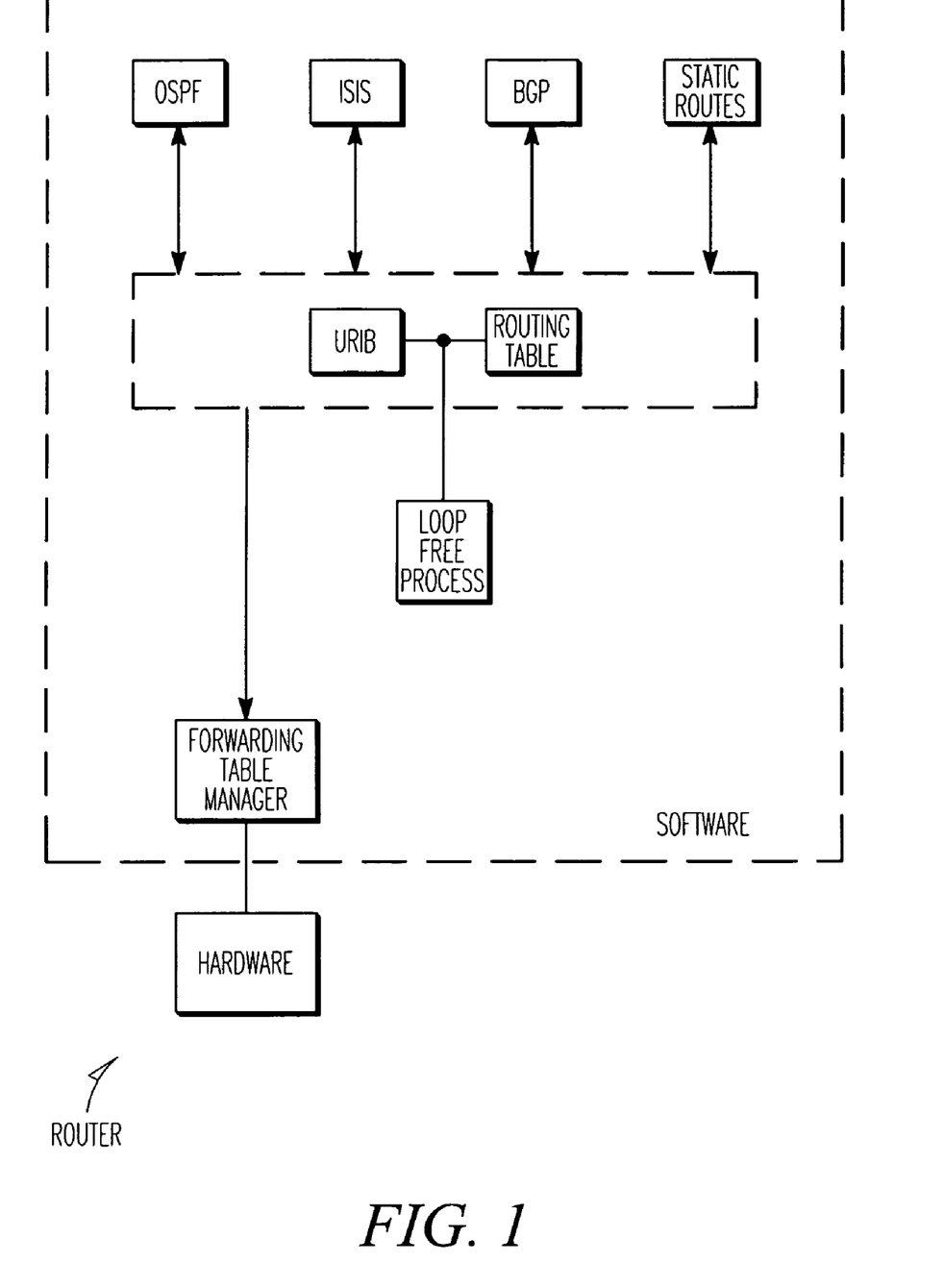
FIG. 1 illustrates a block diagram of an example of a router having a process or module for providing a loop-free routing table, in accordance with one embodiment of the present invention.

Disclosed herein are various embodiments of the present invention for providing a loop free routing table. FIG. 1 illustrates an example of a router which may incorporate one or more features of the present invention. As shown in FIG. 1, a router may have router hardware and software, and a routing table may be maintained by software. In one example, a unicast routing information base (URIB) process maintains the routes and paths in a routing table in response to route information received by one or more processes or routing protocols of the router. For instance, the routing protocols may include OSPF (Open shortest path first), ISIS (Intermediate System—Intermediate System), BGP (Border gateway protocol), and information from static routes obtained by the router.

In one example of the present invention, a module for providing a loop free routing table is provided in the software of the router. The module, in another example, may be incorporated as a process or a set of processes implemented by the URIB, although these processes may be distributed elsewhere within the router. For purposes of this description a next hop is an address directly connected to a router, while a remote next hop is an address connected to the router through at least one other router.

Figure 2:
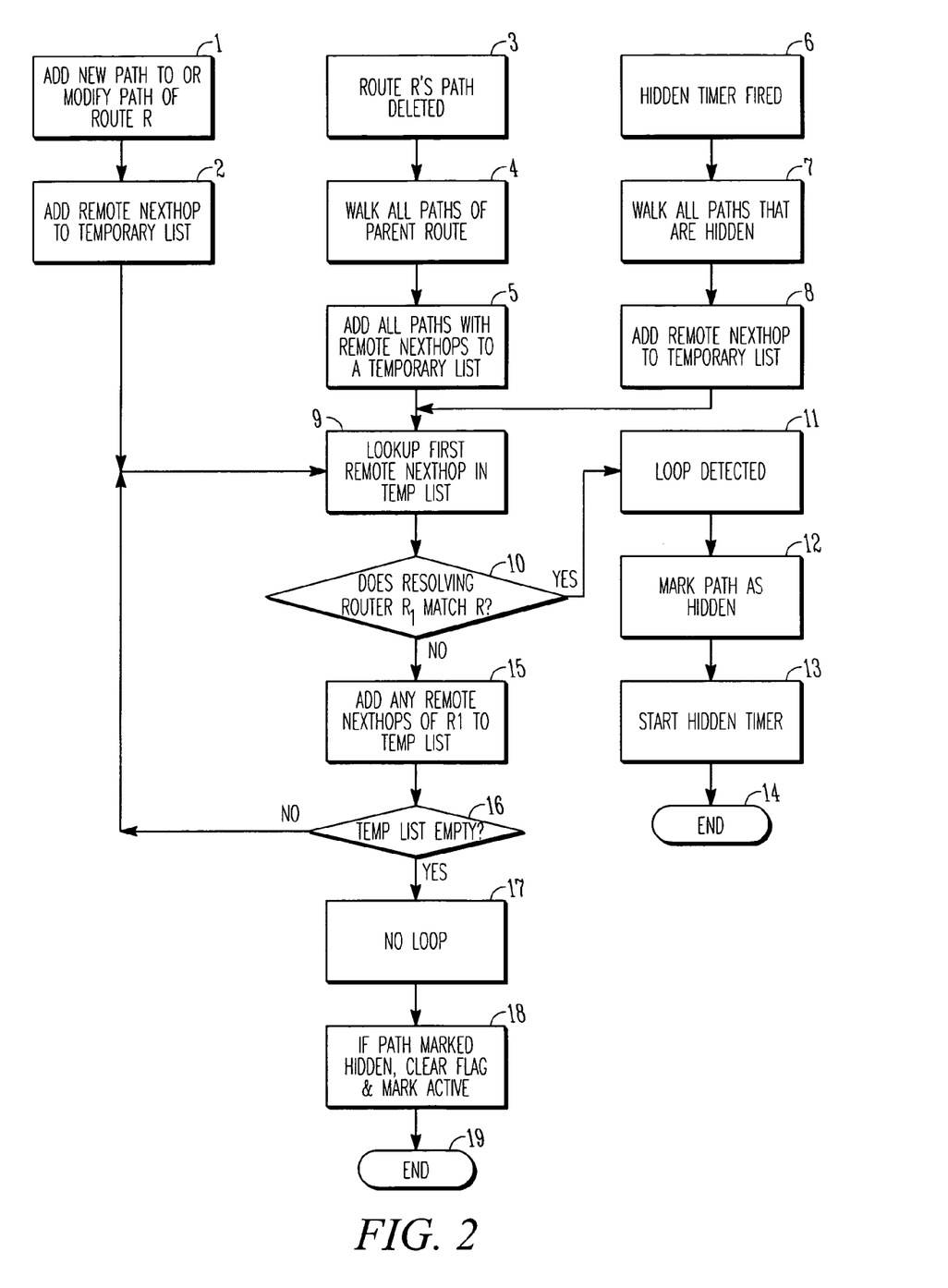
FIG. 2 illustrates an example of operations for providing a loop-free routing table, in accordance with one embodiment of the present invention.

FIG. 2 illustrates an example of logical operations for providing a loop free routing table. In the example of FIG. 2, there are various entry points into the process as indicated with operations 1, 3, and 6. At operation 1, a new path is added to Route R, or a path of Route R is modified, as requested by a client or process of the router. At operation 2, a remote next hop belonging to the Route R is added to a temporary list that is maintained for purposes of this process. It is known to those in the art that the next hop may be an address that should be used as the next destination in a route. The temporary list may be a data structure such as a list or a table, and may be incorporated with other data structures within the router. From operation 2, control is passed to operation 9, described below.

A second entry point into the process is provided by operation 3. In operation 3, one or more paths of a route R is deleted, pursuant to an operation of one of the client processes within the router. As mentioned above, a route such as Route R may have many paths, and each path may have a remote next hop. At operation 4, in response to deletion of a path of Route R, all of the paths of a parent route (i.e. a parent route of Route R) are examined. At operation 5, all paths with remote next hops belonging to Route R are added to the temporary list maintained by this process, and control is passed to operation 9.

Another entry point into this process may be provided at operation 6. In operation 6, a timer, referred to as the hidden timer, expires which passes control to operation 7. The hidden timer of operation 6 is set and loaded by operation 13, described below. At operation 7, in response to expiration of the hidden timer, all paths that are hidden are examined. In one example, this operation may include the traversing of an AVL tree or other data structure containing hidden paths, and each path in the AVL tree contains a remote next hop. At operation 8, any remote next hop belonging to the Route R that is associated with the hidden paths of operation 7 is added to the temporary list. Control is then passed to operation 9.

In one example, operations 9-10 provide loop detection for the router. In general, the system evaluates remote next hops in response to path additions, deletions and modifications to detect and eliminate path loops. At operation 9, a remote next hop is looked up in the temporary list. In one example, this remote nexthop is looked up in a Patricia Trie of routes to find the longest prefix match resolving route, R1. This operation can be performed by any conventional lookup or search algorithm. At operation 10, the remote next hop is resolved which produces a route, and decision operation 10 determines whether this resolving route R1 matches the Route R (i.e., Route R being the route referenced in either operations 1 or 3). If the route resolved from the next hop list matches route R1, then control is passed to operation 11. At operation 11, a loop, also referred to as a mutually recursive route, has been detected because resolving Route R1 matched Route R in operation 10. At operation 12, the path associated with Route R1 is marked as hidden. In one example, each path of a route is provided with a bit or a flag which can be set or cleared to indicate whether the path is active or hidden, or other well known conventional techniques can be utilized for marking a path with a particular characteristic.

At operation 13, a timer (shown as the hidden timer) is initiated. In one example, the hidden timer can be a relatively slow timer, such as a sixty second timer or other time period. It is understood that the particular amount of time or delay associated with the timer of operation 13 is a matter of choice depending on the particular implementation. At operation 14, the route evaluation process is ended, which in one example places the process in a wait state for entry into either operations 1, 3, or 6.

If decision operation 10 determines that resolving the route labeled Route R1 does not mach Route R, then control is passed to operation 15. At operation 15, any remote next hops of Route R1 are added to the temporary list. At operation 16, the temporary list is examined to determine whether it is empty, if the temporary list is not empty, then control is passed by decision operation 16 to operation 9 which in conjunction with operations 10-13 determines whether a loop is detected. If, however, the temporary list is empty as determined by operation 16, then control is passed to operation 17 which means that no loop is currently present in the Route R1. At operation 18, if a path associated with Route R1 has been marked as hidden, then this hidden status is cleared and the path is marked active. Operation 18 then passes control to operation 19, which may be a wait state that waits for events to trigger entry into the process at operations 1, 3, or 6.

Hence, it can be seen that the operations of FIG. 2 provide for a routing table which is loop free. Other implementations or variations of the invention are possible. In one example, the process may detect and break routing loops associated with recursive routes in the URIB. The client processes send the immediate next-hop and also send the recursive next-hop (if it has one for the route) to the URIB. This information is used by the URIB to detect and correct loops caused due to remote next hop resolution.

In one example, embodiments of the present invention may be implemented with routers that include route information in the form of prefixes, described below.

In one example, a route includes a next-hop that is added by a client protocol for a particular prefix. Hence, the loop detection procedure is performed for a route, next-hop, and RNH triplet (i.e., all 3 of these entities will be involved in loop detection procedure, in one example). Once a loop is detected, the next-hop that was under consideration is marked as "hidden". Note that the same route might have other next-hops added by the same protocol or by different protocols which do not lead to RNH loops. These next-hops are preserved as is (remain "active") and are used for normal data forwarding and RNH resolution by clients.

In this example, a remote next hop (RNH) is defined as a hop at least two hops away from the router, while a directly connected next hop (DC) is one hop away from the router. The terms leaf, branch, and root as used herein are analogies drawn from a real tree (leaves are supported by branches which in turn are supported by the tree's root). A route that does not depend on other routes but has other dependant routes is a root route. Such a route is analogous to the root of a tree, a root supports branches and leafs, but the root itself does not depend upon any other element in the tree. A route that is used by other routes and is also dependent on another route is a branch route. Such a route is analogous to a tree's branch, a branch supports leaves (so leaves are dependant on branches), and a branch is dependent on the tree's root. A route that depends upon other routes but has no dependant routes itself is a leaf route. Such a route is analogous to leaves in a tree. Leaves depend on branches and branches in turn depend on the tree's root. But the leaves themselves do not support any other element in the tree i.e. leaves have no dependants.

As such, a root route includes a route with a directly connected nexthop. A branch route may include a route with remote a RNH and it resolves others' RNHs. A leaf route includes a route with a RNH but its prefix does not resolve any RNH.

For example, the following routes are classified as:

Route 10/8 with a RNH of 20.1.1.1 is classified as a Leaf,
Route 20/8 with a RNH of 30.1.1.1 is classified as a Branch, and
Route 30/8 with a DC is classified as a Root.

Routes in the URIB may be classified as active or hidden. An active route includes a route in the URIB that can be used for route lookup, and a hidden route includes a route in the URIB that cannot be used for route lookup. In one example, embodiments of the present invention provide that after every individual route transaction (i.e., adding, modifying or deleting a route), the active routes remain loop free.

In one example, loop detection generally involves active routes, and recursive route procedures by URIB clients involve only active routes. If all the next-hops of the longest match lookup for a given RNH are "hidden," then the next less specific route is looked up and so on till a route with "active" next-hops is found. This route is used for resolving the RNH. Further, only "active" routes are used for forwarding traffic.

Given a branch route, its RNH is looked up in the routing table. The procedure may recur until a DC is reached or the new RNH can only be resolved by the given branch route and cannot be resolved by a more specific routes in the routing table. The latter case indicates the presence of a loop.

In one example, if parallel paths are discovered during loop detection, all paths are followed. As long as one path leads to a loop, a loop is declared without the need to search any further.

A loop can be formed in the routing table by addition of a particular route or by deletion of a particular route. In one example, the active routes are ensured to be loop free by the following operations. Where a route is added:

a) If the route is a leaf and its RNH is resolvable according to the RNH table, it is added as an active route.

b) If the route is a root route, it is added as an active route and the process is complete.

c) If the route is a branch route, the route is added and loop detection is performed. The newly added route is considered with all the other routes in the URIB to find loops.

d) If a loop is detected, the route is marked as "hidden", and the process is done.

Where a route is deleted from the route table:

a) If the route is hidden, then no loop detection is performed for this action.

b) If the route is a leaf route, then no loop detection is performed for this action.

c) If the route is a branch or root route, the parent of the route is obtained. The parent is the less specific route of the removed route. It may be found by doing route lookup using the removed route prefix and make sure the result has shorter mask length.

d) If the parent is a leaf or root route, then no loop detection is performed for this action.

e) Perform loop detection with the parent. If loop is not found, then done.

f) Marks the parent as hidden. Find the parent of the current parent and goes to step d).

Hidden routes may be re-added or recovered when it no longer causes a routing loop in URIB. In one example, all hidden routes are put on the hidden list. Whenever an active branch or active root route is added/deleted, a timer is started if the hidden routes list is non-empty. The routes in the hidden list are reevaluated for addition using the operations described above with regard to addition of routes at the expiration of the timer.

In one example, hidden route recovery is not done during route addition and deletion because doing so would involve reverse route lookup, from route to RNH to route and so on. Moreover, hidden routes are an exception case and so their recovery is not required for the process to operate.

In one example, whenever a route is changed, including hidden/active state changes, RNH notification is sent to clients. That is, a walk after match is done with the route prefix over the RNH table and triggers RNH notification if the RNH is resolved using the changed route.

EXAMPLES

The following examples are provided to illustrate how embodiments of the present invention may operate. It is understood that these examples are provided for illustrative purposes only.

Figure 3:
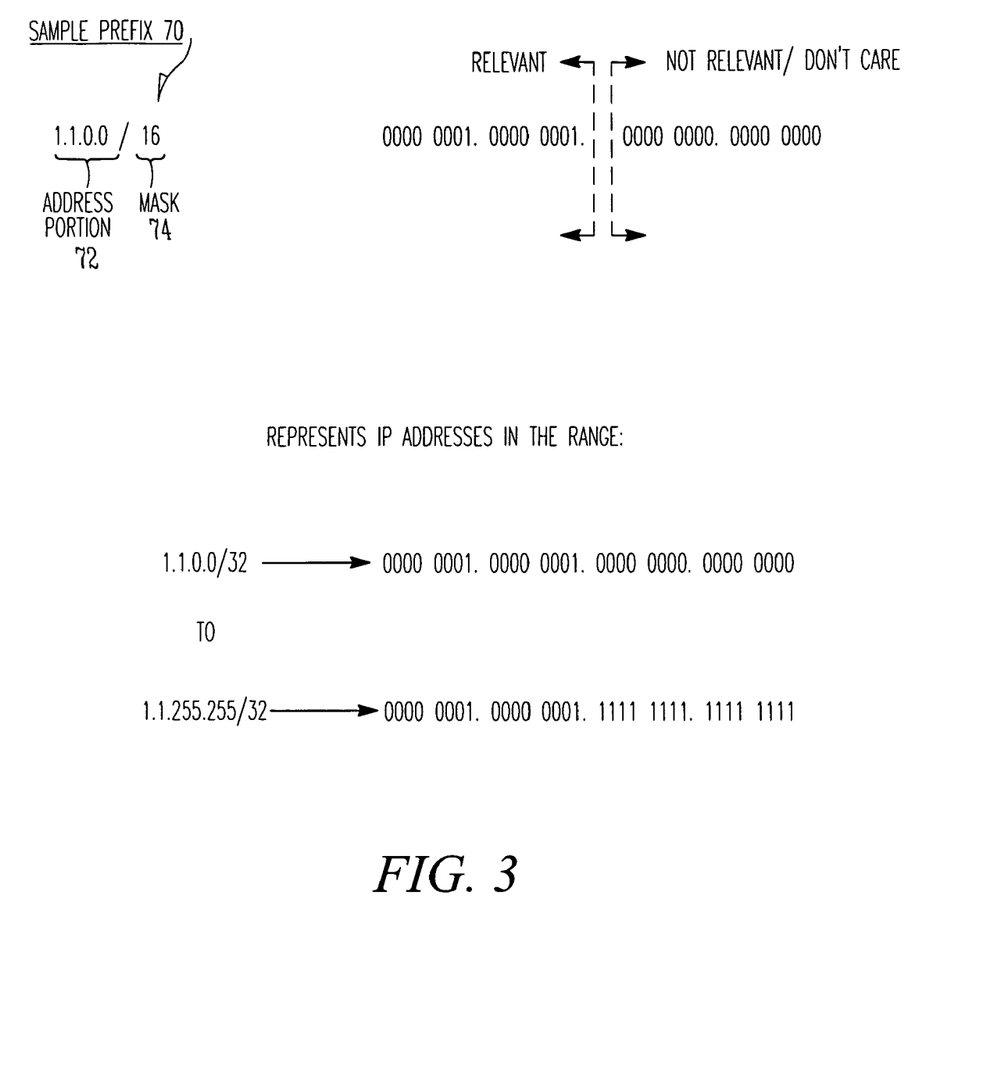
FIG. 3 illustrates an example of IP addresses represented using prefixes having an address portion and a mask portion.

FIG. 3 illustrates an example of a prefix used to represent a range of IP addresses and next hop information, as used in accordance with one embodiment of the present invention.

In one example, entries of a routing table contain IP address information which may be represented using prefixes 70. A prefix 70 is a shorthand expression of an IP address or a range of IP addresses. An IP address is comprised of four eight bit values separated by periods. As shown in FIG. 3, a prefix 70 includes an address portion 72 and a mask portion 74. The address portion 72 specifies a 32 bit value, while the mask portion 74 specifies a number of bits that are relevant in interpreting the address portion 72 of the prefix 70. In one example, the mask portion 74 of a prefix 70 specifies the number of left most bits of the address portion which are relevant, with the remaining bits being irrelevant or "don't cares." For instance, as illustrated in the example prefix of FIG. 3, the prefix 1.1.0.0/16 represents IP addresses in the range of 1.1.0.0/32 through 1.1.255.255/32.

Example 1

Self Recursion

Routes:
0/0→DC
10/8→20.1.1.1
20/8→20.1.1.1

Suppose the URIB contains 0/0 and 10/8 as active routes. With the addition of route 20/8, the 20/8 route will be hidden since loop is detected. This kind of self-recursion can be placed on a separate list that is not a hidden list since it will never recover the route. With the deletion of route 0/0, the 0/0 route can be simply removes because it has no parent. A RNH notification is sent for RNH 20.1.1.1, which can no longer be resolved, and a Client can then remove routes 10/8 and 20/8.

Example 2

Loop Caused by Addition of a Particular Route

Routes:
0/0→DC
10/8→20.1.1.1
20/8→30.1.1.1
30/8→40.1.1.1
40/8→10.1.1.1
50/8→10.1.1.1

Suppose the URIB initially contains 0/0, 10/8, 20/8 and 30/8 as active routes. With the addition of route 40/8, the 40/8 route is hidden since a loop is detected. With the deletion of route 10/8, the 10/8 route is removed. Route 10/8's parent is route 0/0 and because route 0/0 is a leaf route, no more work is required. The RNH notification is sent for RNH 10.1.1.1. Since the hidden list is non-empty, the list is reevaluated when the timer expires (for example one minute later). Then the 40/8 route introduces no loop so it is changed to an active status. A RNH notification is sent for RNH 40.1.1.1. The URIB now contains active routes 0/0, 20/8, 30/8 and 40/8.

With the deletion of route 0/0, which has no parent, the route is simply removed. A RNH notification is sent for RNH 10.1.1.1, which can no longer be resolved. The Client can then remove route 40/8, which triggers a RNH notification for RNH 40.1.1.1. The Client can then remove route 30/8 and so on until route 20/8 is removed. When the URIB detects that a route can no longer be resolved, the route is marked as hidden and put on hidden list. The client would then remove the route from URIB as describe above. The URIB contains no routes at this time.

With the addition of route 0/0, the 0/0 route is added and a RNH notification is sent for RNH's 10.1.1.1, 20.1.1.1, 30.1.1.1 and 40.1.1.1. Depending on the order of arrival, the last routes that cause a loop are hidden. For example, route 10/8 is marked as hidden. The URIB now contains 0/0, 20/8, 30/8, 40/8 as actives routes.

With the addition of route 50/8, the 50/8 route is classified as a leaf route and RNH 10.1.1.1 is resolvable with route 0/0, so route 50/8 it is added.

Example 3

Loop Caused by Removal of a Particular Route

Routes:
0/0→DC-1
10/8→20.1.1.1
20/8→30.1.1.1
30/8→40.1.1.1
40/8→10.1.1.1
30.1/16→DC-2

Suppose the URIB contains active routes 0/0, 10/8, 20/8 and 30/8. Route 40/8 placed on the hidden list. With the additions of route 30.1/16, route 30.1/16 is not involved in a loop so it is added as an active route. A RNH notification is sent for RNH 30.1.1.1. The RNH notification of RNH 20.1.1.1 and 10.1.1.1 would be triggered in turn. A 40.1.1.1 RNH notification is not triggered since route 40/8 is a hidden route. The hidden list is reevaluated based upon the hidden timer and 40/8 route is re-added as active since the 30.1/16 route breaks the originally detected loop. A RNH notification for RNH 40.1.1.1 is sent and triggers an update. A RNH notification for RNH 30.1.1.1 is not sent since RNH 30.1.1.1 is now resolved through route 30.1/16 instead of route 30/8.

With the deletion of route 30.1/16, the route 30.1/16 is removed and a RNH notification for RNH 30.1.1.1 is sent. Since route 30.1/16 is a root route, the parent 30/8 route is checked for routing loops. A loop is detected and so route 30/8 is moved to the hidden status. Again a RNH notification for RNH 30.1.1.1 is sent. Because route 30/8 is a branch route, its parent route 0/0 is checked for a loop. No loop is found and the deletion of route 30.1/16 is done. The RNH notification for RNH 30.1.1.1 can cause it to resolve over route 0/0. Then RNH's 20.1.1.1 and 10.1.1.1 will go through the same change.

In one example, loop detection may be done by calling a loop that takes in the URIB next hop type that needs to be checked for loops as an input parameter. It then initializes a list with the NH as the only element. It continues evaluation until the list is empty. In each iteration it picks the first NH and does a URIB longest match lookup on its RNH. This results in a route whose "active" next-hops are then added to the front of the list.

The above procedure (adding NHs to the front of the list) results in a "depth first" search of the NH dependency chain. The process stops when an attached route is reached or when there is a return to the initial source route. A depth first search is useful because the fan-out of the dependency chain may be large, but the depth is relatively small. If transient memory is used to run the loop detection, the amount of memory used can be reduced by this process.

In one example, the loop detection process is called on 3 events happening.

1. When a {route, NH, RNH} triplet is added by a client protocol and the NH becomes one of the best_hops (hops are often prioritized as best and back-up). The loop detection process is invoked on the NH. If a loop is found, the NH is marked as "hidden". An RNH notification is not required to be sent if the freshly added route is hidden.

2. When a {route, NH, RNH} gets deleted and this NH was in the best_hops list of the route. The loop detection process is invoked for all the parents of the route whose NH was deleted. On detecting a loop for the parents NH, that NH is marked as a hidden route. A RNH notification is not needed for routes dependent on the parent route whose NH was marked as hidden. That is, since there was a loop with the parents NH, the route that depended on it would have previously depended on the deleted NH. When the more specific route is deleted, and the parent NH marked as hidden, this NH will not show up when a client does the route resolution for the dependent route. Ultimately the RNH procedure takes care of removing the NH for the parent route.

3. When a {route, NH, RNH} gets deleted and this NH was in the best_hops list. As a result of this deletion a dependent NH which was hidden before has to be made "active". Changing the route status can be expensive to execute inline when the route deletion is done, as such it can be done by a separate thread. All hidden NHs are part of an AVL tree and the next-hops memory address is the key to this AVL tree. In one example, each node in the tree looks as follows:

```
/*
 * Hidden PT to hold all next-hops which have the hidden
 flag set (due to RNH loop).
 */
typedef struct urib_hidden_nh_ {
    avl_node_t      avl_node;
    urib_nhtype     *nh;
    urib_pibtype    *pib; [Protocol Information Block]
    urib_routetype  *route;
} urib_hidden_nh;
```

When a NH is hidden it is also added to this AVL tree. Periodically the hidden timer triggers a timer thread to evaluate the tree. For every hidden NH it calls a check loop procedure to check if this NH is still part of a RNH dependency loop. If not, it unsets the hidden flag from the NH and removes it from the AVL tree. No RNH notifications are required in this example.

While the methods disclosed herein have been described and shown with reference to particular operations performed in a particular order, it will be understood that these operations may be combined, sub-divided, or re-ordered to form equivalent methods without departing from the teachings of the present invention. Accordingly, unless specifically indicated herein, the order and grouping of the operations is not a limitation of the present invention.

If desired, a computer program product such as a CD-ROM or other media or programmed memory can include one or more features of the present invention.

Figure 4:
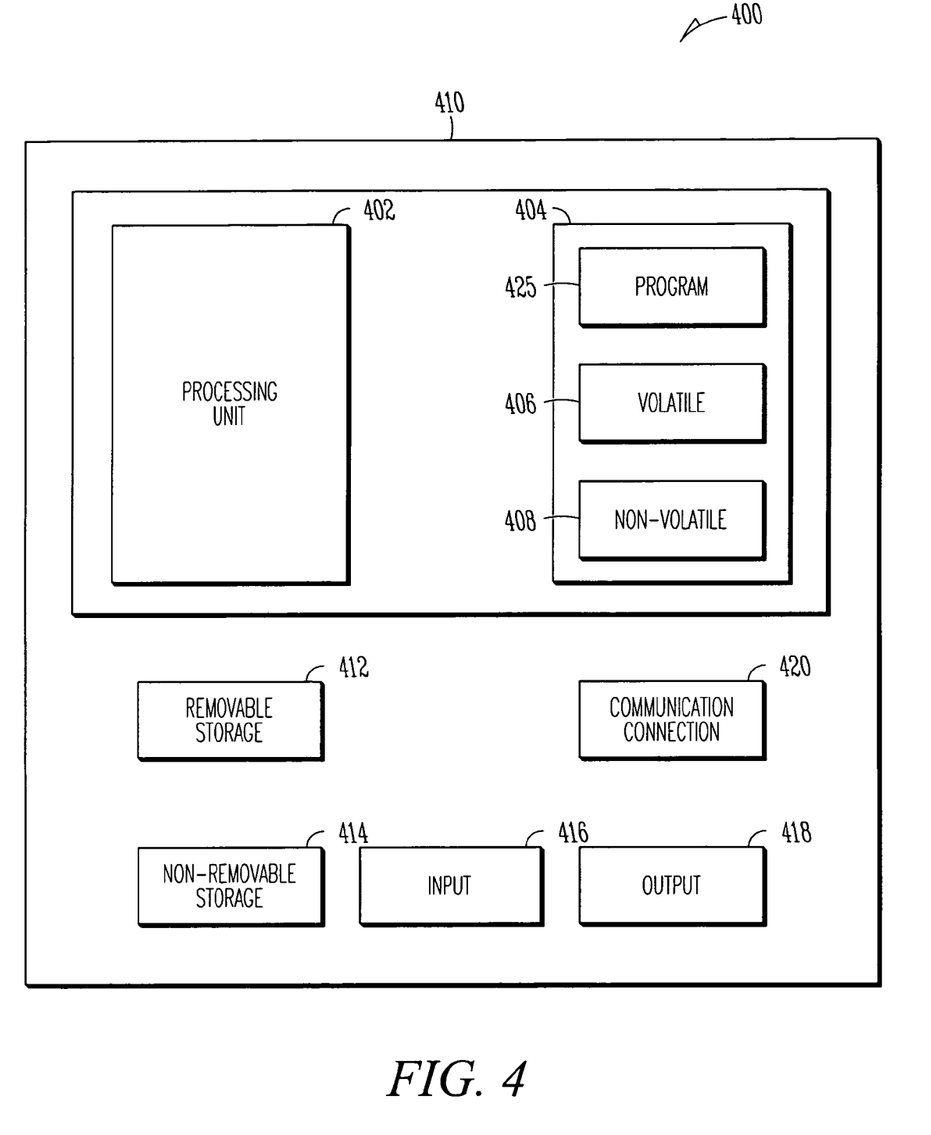
FIG. 4 illustrates a processing system according to an embodiment of the invention.

A block diagram of a computer system is shown in FIG. 4. In one embodiment, multiple such computer systems are utilized in a distributed. One example computing device in the form of a computer 410, may include a processing unit 402, memory 404, removable storage 412, and non-removable storage 414. Memory 404 may include volatile memory 406 and non-volatile memory 408. Computer 410 may include—or have access to a computing environment that includes—a variety of computer-readable media, such as volatile memory 406 and non-volatile memory 408, removable storage 412 and non-removable storage 414. Computer storage includes random access memory (RAM), read only memory (ROM), erasable programmable read-only memory (EPROM) and electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. Computer 410 may include or have access to a computing environment that includes input 416, output 418, and a communication connection 420. The computer may operate in a networked environment using a communication connection to connect to one or more remote computers, such as database servers. The remote computer may include a personal computer (PC), server, router, network PC, a peer device or other common network node, or the like. The communication connection may include a Local Area Network (LAN), a Wide Area Network (WAN) or other networks.

Computer-readable instructions stored on a computer-readable medium are executable by the processing unit 402 of the computer 410. A hard drive, CD-ROM, and RAM are some examples of articles including a computer-readable medium. The term "computer readable medium" is also used to represent carrier waves on which the software is transmitted. For example, a computer program 425 capable of executing the transformation methods for the present invention may be included on a CD-ROM and loaded from the CD-ROM to a hard drive. The computer-readable instructions allow computer 410 to provide generic access controls in a COM based computer network system having multiple users and servers.

It should be appreciated that reference throughout this specification to "one embodiment" or "an embodiment" or "one example" or "an example" means that a particular feature, structure or characteristic described in connection with the embodiment may be included, if desired, in at least one embodiment of the present invention. Therefore, it should be appreciated that two or more references to "an embodiment" or "one embodiment" or "an alternative embodiment" or "one example" or "an example" in various portions of this specification are not necessarily all referring to the same embodiment. Furthermore, the particular features, structures or characteristics may be combined as desired in one or more embodiments of the invention.

Similarly, it should be appreciated that in the foregoing description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the inventions require more features than are expressly recited in each claim that issues from this provisional application. Rather, inventive aspects lie in less than all features of a single foregoing disclosed embodiment, and each embodiment described herein may contain more than one inventive feature.

While the invention has been particularly shown and described with reference to various embodiments thereof, it will be understood by those skilled in the art that various other changes in the form and details may be made without departing from the spirit and scope of the invention.

What is claimed is:

1. A router comprising:
   a routing module configured to maintain a routing table containing route information to determine data traffic routes;
   a module to evaluate remote next hops in response to path changes in a route of the routing table and to detect a loop path associated with the route, the module to add the loop path to a hidden list, the module further to maintain a list of remote next hops associated with paths of the route that are not hidden; and
   a hidden timer to periodically trigger a timer thread and to reevaluate the route associated with the loop path added to the hidden list.

2. The router of claim 1 wherein the module is implemented by a unicast routing information base (URIB) of the router.

3. The router of claim 1 wherein the module designates remote next hops resulting in the loop path as inactive.

4. The router of claim 1 wherein the list of remote next hops is evaluated in response to adding, modifying, or deleting a route from the router.

5. The router of claim 1 wherein the list of remote next hops is evaluated in response to adding a first route to the routing table, and wherein the first route added is a branch route that is used by a second route and is also dependent on a third route.

6. The router of claim 5 wherein the first route is designated as an active route if no loop path is detected and designated as inactive if a loop path is detected.

7. The router of claim 1 wherein the list of remote next hops is evaluated in response to deleting a first route from the routing table, and wherein the first route is dependent upon a parent route and the module evaluates the parent route.

8. A router comprising:
   a routing module configured to maintain a routing table containing route information;
   a module to evaluate remote next hops in response to path changes in a route using the routing table and detect a loop path associated with the route, the module to maintain a list of remote next hops associated with paths of the route and to designate remote next hops resulting in a loop path as inactive; and
   a hidden timer to periodically trigger a timer thread and to reevaluate the paths of the route resulting in the loop path to determine whether the remote next hops should remain inactive.

9. The router of claim 8 wherein the module periodically evaluates the route to determine if a previously detected loop has been eliminated.

10. The router of claim 8 wherein the list of remote next hops is evaluated in response to adding a first route to the routing table, wherein the first route added is a branch route that is used by a second route and is also dependent on a third route, and wherein the first route is designated as an active route if no loop path is detected and designated as inactive if the loop path is detected.

11. The router of claim 8 wherein the list of remote next hops is evaluated in response to deleting a first route from the routing table, and wherein the first route is dependent upon a parent route and the module evaluates the parent route.

12. A method comprising:
   evaluating remote next hops in communication routes in a system to detect path loops in response to changes in the communication routes;
   maintaining a list of remote next hops associated with each route;
   designating routes associated with a loop as inactive routes; and
   periodically reevaluating the inactive routes associated with the loop and, based on a determination that the inactive routes are no longer associated with the loop, removing the designation of the inactive route and redesignating the inactive routes as active.

13. The method of claim 12 wherein designating the routes associated with the loop as inactive routes comprises designating remote next hops associated with the routes as inactive.

14. The method of claim 13 wherein the list of remote next hops is evaluated in response to adding a first route, wherein the first route is a branch route that is used by a second route and is also dependent on a third route, and wherein the first route is designated as an active route if no path loop is detected and designated as inactive if the path loop is detected.

15. The method of claim 13 wherein the list of remote next hops is evaluated in response to deleting a first route, wherein the first route is dependent upon a parent route, and wherein evaluating the communication routes to detect path loops comprises evaluating the parent route.

16. A method comprising:
   evaluating remote next hops in communication routes in a system to detect path loops in response to changes in the communication routes;

designating routes associated with a loop as inactive routes;

maintaining a list of remote next hops associated with each route;

periodically re-evaluating the inactive routes to determine whether a previously detected loop has been eliminated; and based on a determination that the previously detected loop has been eliminated, re-designating routes associated with an eliminated loop as active routes.

17. The method of claim 16 wherein designating the routes associated with the loop as inactive routes comprises designating remote next hops associated with the routes as inactive.

18. A router comprising:

means for evaluating remote next hops in communication routes in a system to detect path loops in response to changes in the communication routes;

means for maintaining a list of remote next hops associated with each route;

means for designating routes associated with a loop as inactive routes; and means for periodically reevaluating the inactive routes and making a determination whether the inactive routes remain associated with a loop.

19. The router of claim 18 further comprising means for designating routes associated with an eliminated loop as active routes.

20. The method of claim 18 wherein the means for designating the routes associated with the loop as inactive routes further designates remote next hops associated with the routes as inactive.

* * * * *